United States Patent [19]

Widrow

[11] 4,363,112
[45] Dec. 7, 1982

[54] APPARATUS AND METHOD FOR DETERMINING THE POSITION OF A GAS-SATURATED POROUS ROCK IN THE VICINITY OF A DEEP BOREHOLE IN THE EARTH

[76] Inventor: Bernard Widrow, 860 Lathrop Dr., Stanford, Calif. 94305

[21] Appl. No.: 141,271

[22] Filed: Apr. 18, 1980

[51] Int. Cl.³ .......................... G01V 1/40; G01V 1/28; G01V 1/20
[52] U.S. Cl. ........................................ 367/30; 367/47; 367/49; 181/106; 181/113
[58] Field of Search ..................... 367/14, 28, 25, 30, 367/45, 47, 57, 61, 83, 49; 181/106, 110, 118, 113

[56] References Cited

U.S. PATENT DOCUMENTS

| | | | |
|---|---|---|---|
| 2,062,151 | 11/1936 | Weatherby | 367/83 |
| 2,933,144 | 4/1960 | Scott et al. | 367/81 |
| 3,292,143 | 12/1966 | Russell | 367/30 |
| 3,346,068 | 10/1967 | Woods et al. | 367/61 |
| 3,529,282 | 9/1970 | Brown et al. | 367/61 |
| 3,690,164 | 9/1972 | Gabillard et al. | 367/14 |
| 3,739,871 | 6/1973 | Bailey | 367/14 |
| 3,921,126 | 11/1975 | Waters | 367/47 |
| 4,009,609 | 3/1977 | Sayer et al. | 367/25 |
| 4,046,220 | 9/1977 | Glenn | 367/30 |
| 4,057,780 | 11/1977 | Shuck | 367/86 |
| 4,207,619 | 6/1980 | Klaveness | 367/36 |
| 4,214,226 | 7/1980 | Narassimban | 367/57 |
| 4,280,200 | 7/1981 | Silverman | 367/14 |
| 4,282,587 | 8/1981 | Silverman | 367/14 |
| 4,298,967 | 11/1981 | Hawkins | 367/57 |

OTHER PUBLICATIONS

Ritch et al., "Evidence of Low Free Gas . . . Spot Sands", 6/12/76, pp. 1–11, SPWLA 17th Logging Symp., Denver, Colorado.
Savit, "Bright Spot in the Energy Picture", 2/74, pp. 60–65, Ocean Industry.
Widrow et al., "Adaptive Noise Cancelling . . . ", 12/75, pp. 1692–1716, Proc. IEEE, vol 63, #12.
Widrow et al., "Stationary and Nonstationary . . . Filter", 8/76, pp. 1151–1162, Proc. IEEE, vol. 64, #8.

Primary Examiner—Nelson Moskowitz
Attorney, Agent, or Firm—Flehr, Hohbach, Test, Albritton & Herbert

[57] ABSTRACT

Apparatus for determining the position of a gas-saturated porous rock in the vicinity of a deep borehole in the earth, drilled to a selected depth below the expected position of the porous rock. The apparatus includes a source of seismic waves of selected characteristic, positioned at a selected point in the borehole, with an array of geophones positioned on the earth in known positions around the borehole. These geophones are adapted to receive the seismic waves generated by the source in the borehole, after traveling upwardly through the earth, and to produce corresponding facsimile electrical signals. If the seismic waves from the source, in their upward movement to the surface, pass through a gas-saturated porous rock they will be attenuated, and therefore the signals from the geophones which are in the shadow of this gas-saturated rock will show a change of character and/or an attenuation. If the shadow is observed while drilling at two or more known depths, the depth, azimuth, and radial position, from the borehole, of the gas-saturated rock can be determined. Using the principle of reciprocity, the same measurements can be made by interchanging the positions of seismic source and receiving sensor. A geophone lowered into an open borehole on a wire line will receive signals from a surface seismic source. Attenuations along certain downward ray paths indicate the shadow zones from which the depth, size, and position of a gas-saturated reservoir can be deduced.

5 Claims, 10 Drawing Figures

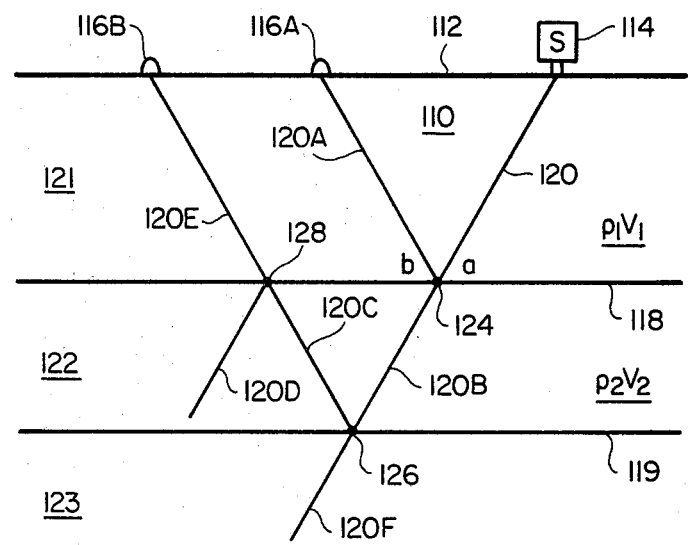
FIG_1
(PRIOR ART)
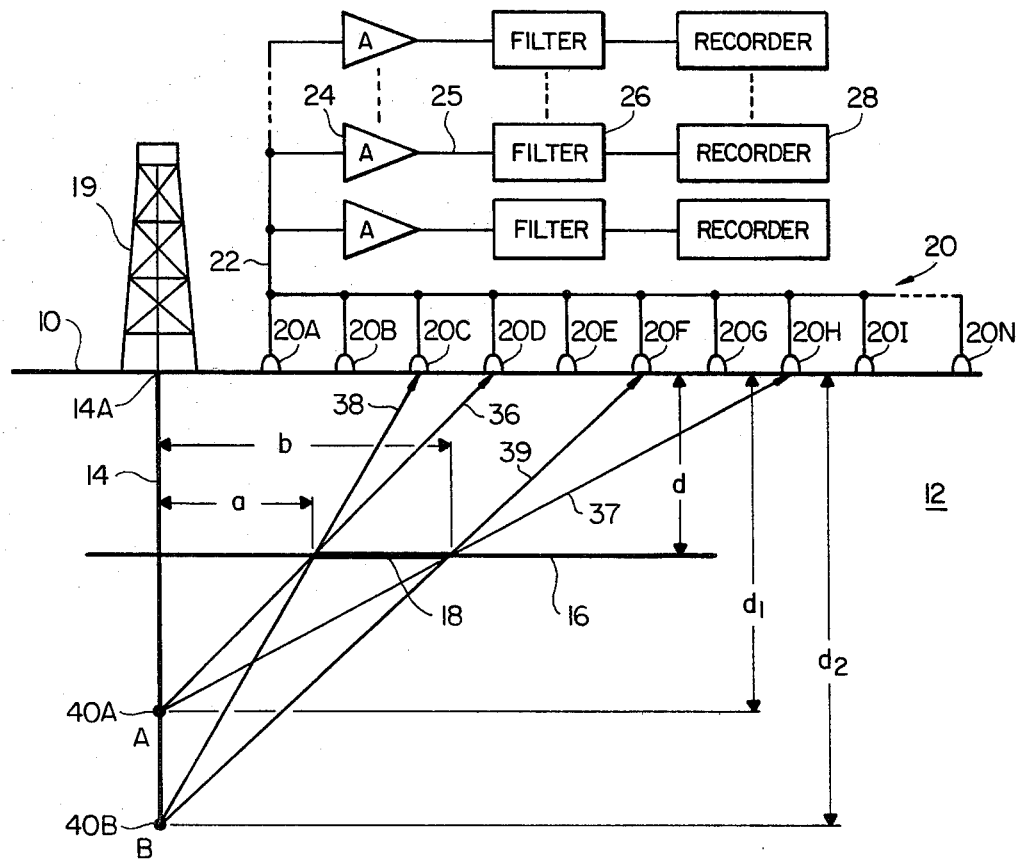
FIG_2

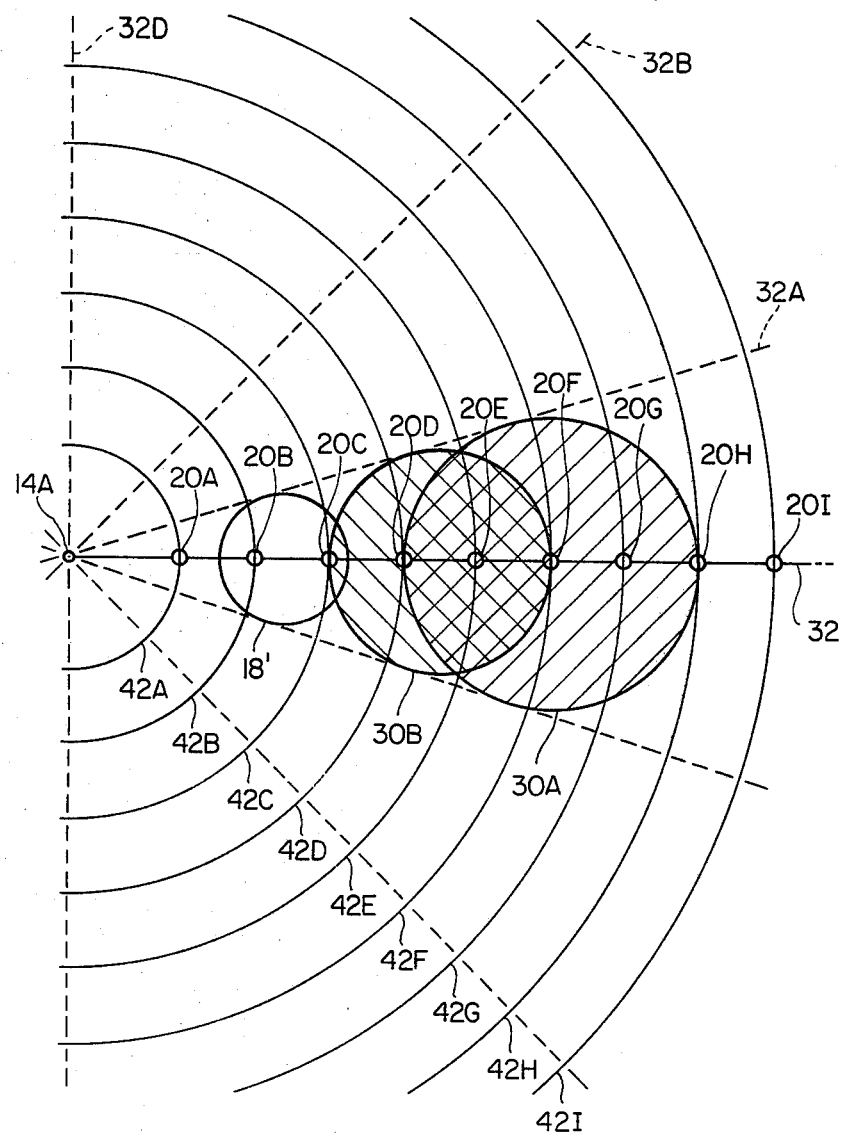
FIG_3
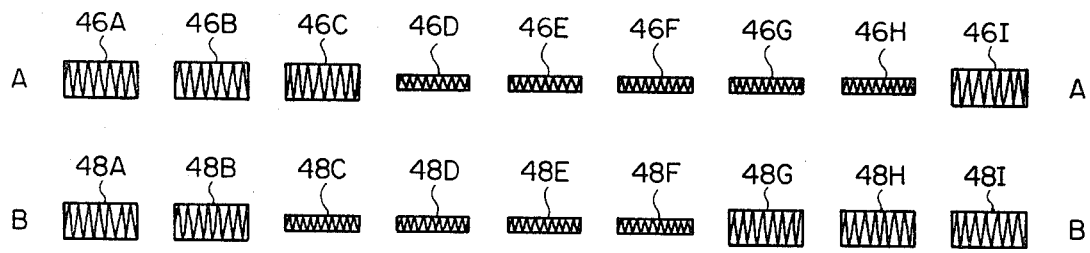
FIG_4

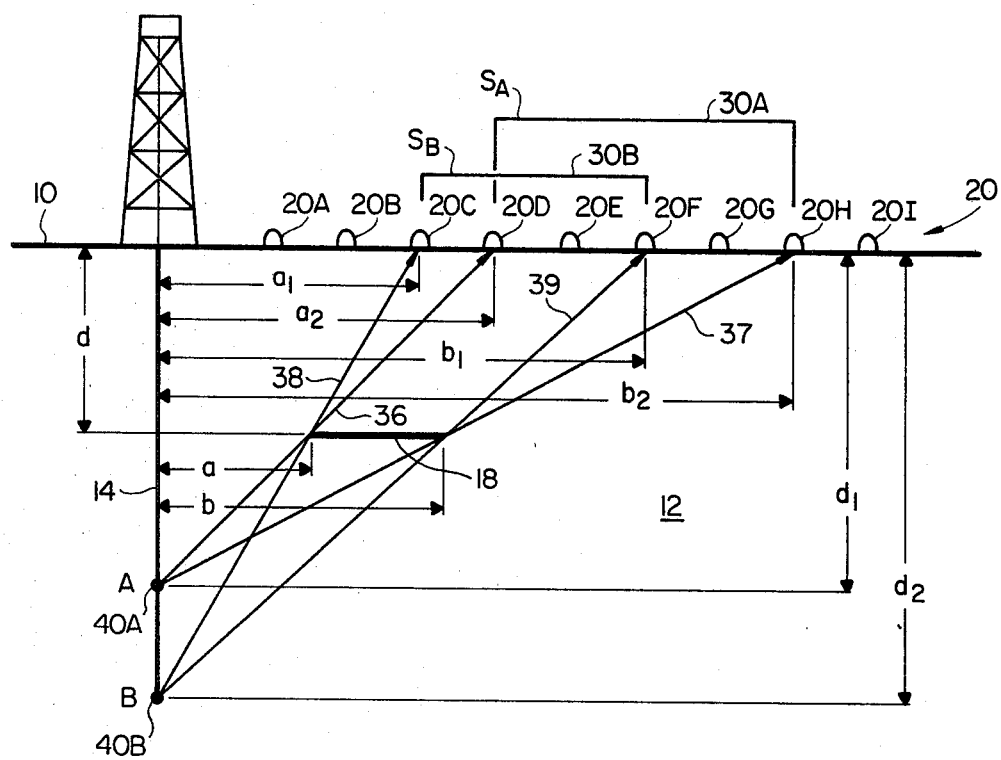
FIG_5
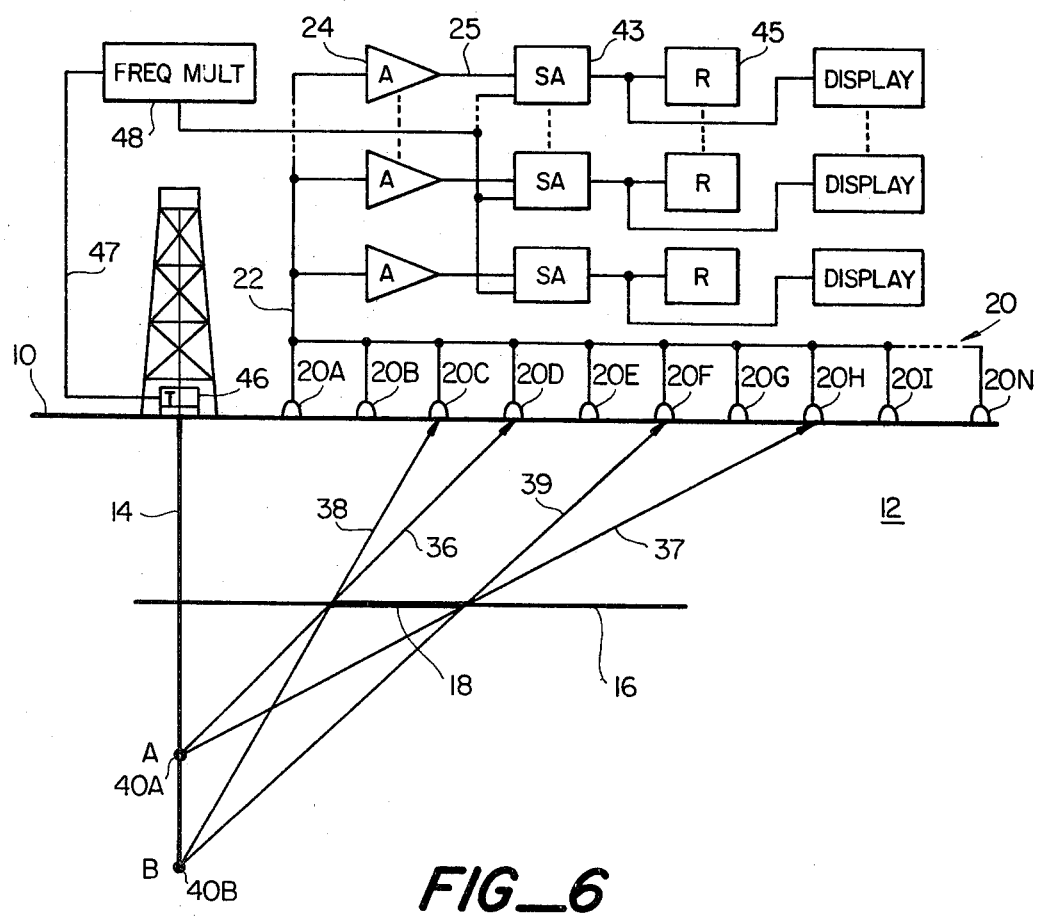
FIG_6

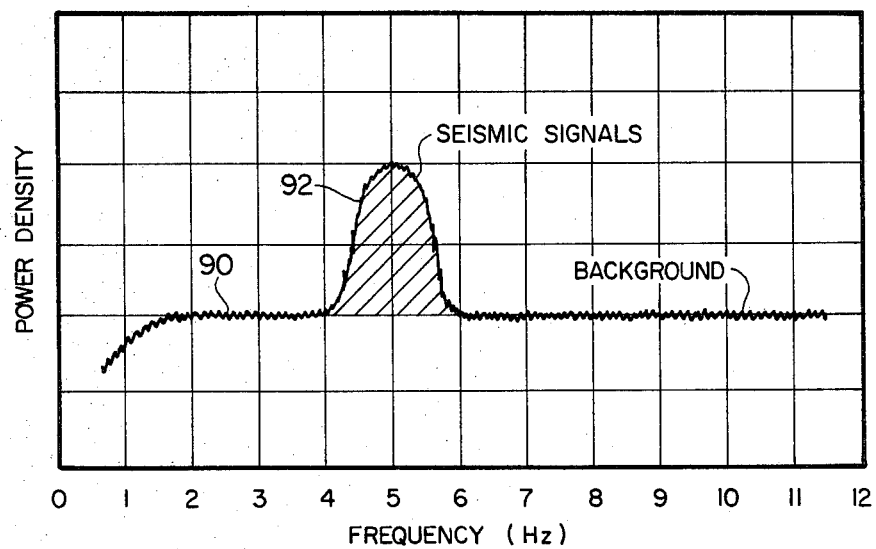
FIG_7
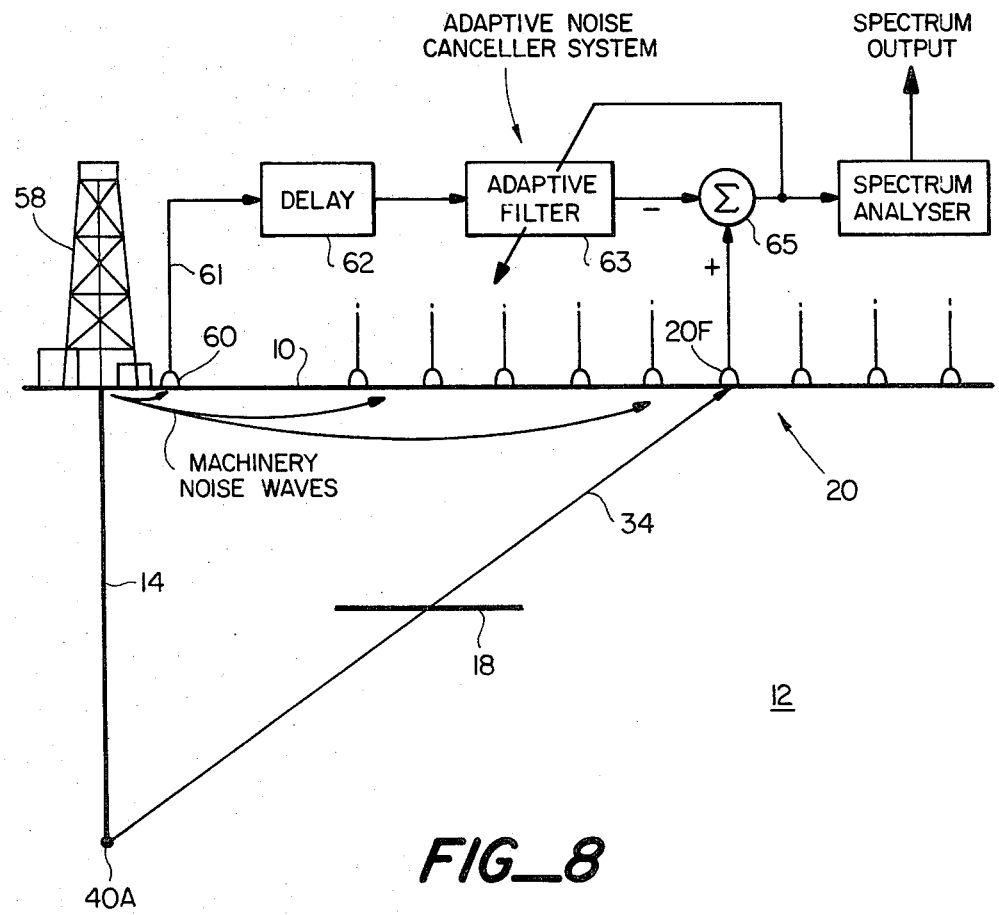
FIG_8

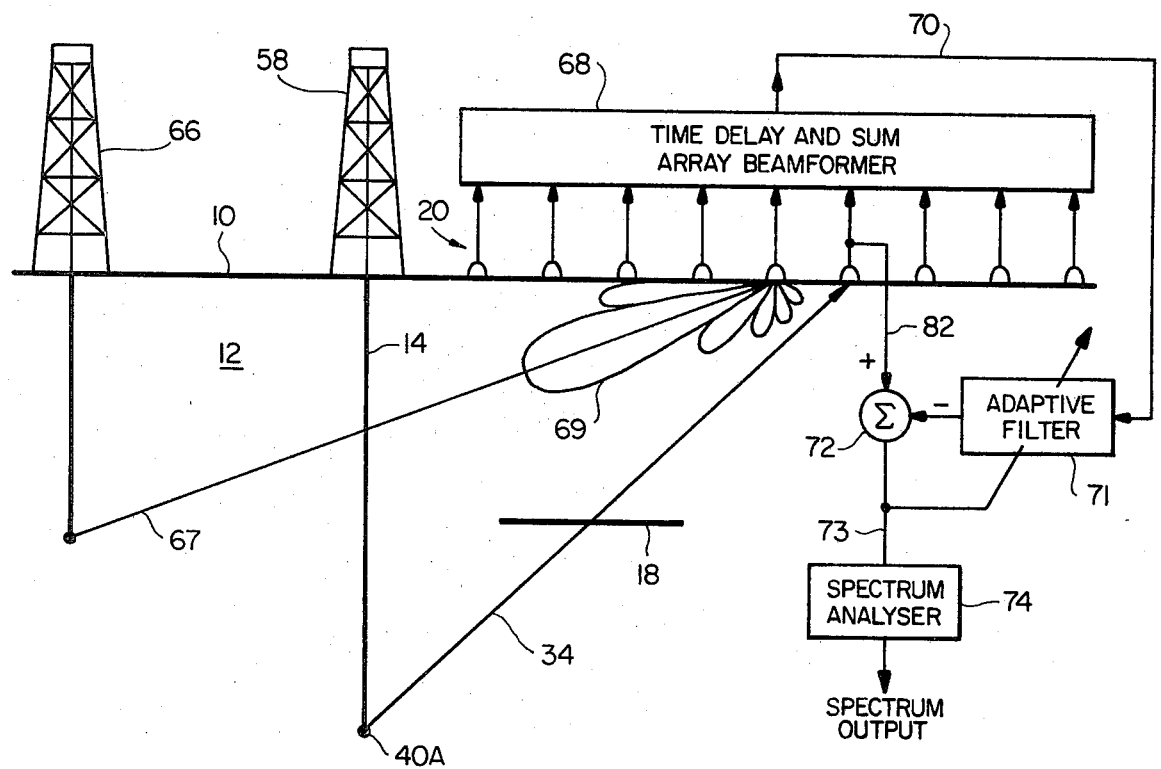
FIG_9
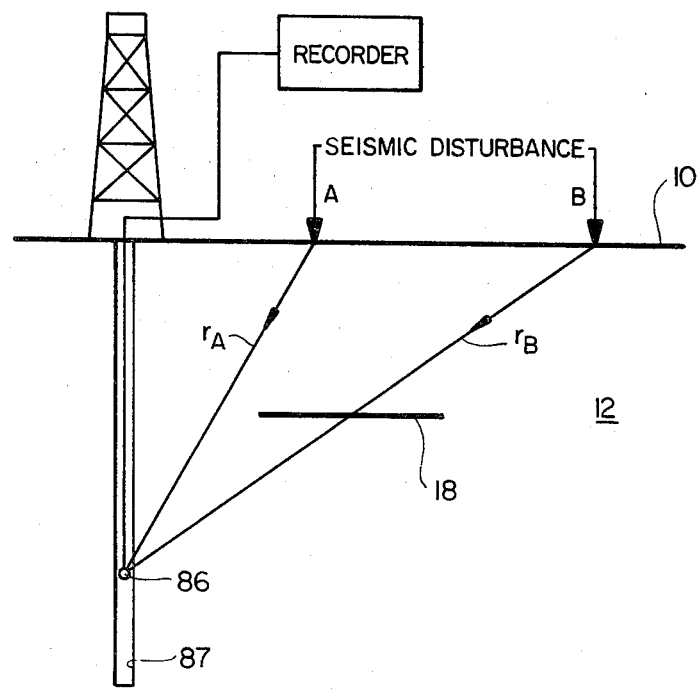
FIG_10

APPARATUS AND METHOD FOR DETERMINING THE POSITION OF A GAS-SATURATED POROUS ROCK IN THE VICINITY OF A DEEP BOREHOLE IN THE EARTH

This invention lies in the field of mapping of geologic formations, which have gas-saturated porous rock, sand or the like.

More particularly it concerns apparatus of which, while drilling a borehole, measurements can be made which will indicate the presence of a gas-saturated porous rock formation, above the position of the seismic source, including its depth, azimuth and radial distance from the borehole. The seismic source could be the natural emanations from the drill bit while boring into the earth, or could be one of a number of devices that could be located at the drill bit or lowered by some other means into the borehole.

In the field of exploration for oil and gas, there has been great interest in the so-called "Bright Spot" method of location of gas-filled porous formations by the seismic process. Although this method of location of gas zones in porous rocks is not infallible, the bright spot technique has helped in an important way to locate gas reservoirs in the subsurface.

As a part of the process of finding such gas sources, a well was sometimes drilled which passed through a porous rock formation at the depth of the suspected gas zone, but did not find gas. The conclusion was that while the geologic formation might have been porous at the particular depth, the gas had migrated to and localized at a different lateral position. It was postulated that by deflecting the borehole in one direction or the other, the gas pocket or gas reservoir might be found.

As part of this same problem, considerable work has been done in the industry, after a borehole has been drilled through the prospective gas formation but has found no gas, to lower a gravimeter into the borehole. This instrument has the capability of determining whether, at some horizontal level in the vicinity of the borehole, there is a reduced density of rock, such as might occur when the pores in the rock are filled with gas, rather than with a liquid such as water or oil.

By the use of such gravimetric measurements, sizeable gas reservoirs have been discovered, and by deflecting the borehole in the direction of the gas pocket, have been put into production.

The gravimeter indicates depth of a gas reservoir, but not direction or distance from the borehole. It is an object of this invention to provide a means for locating such a reservoir by indicating not only its depth but also its position and bearing relative to the borehole.

A considerable volume of prior art exists in the field of drill bit logging. In this art, a seismic source is built into the drilling apparatus near the bit, so that seismic signals can be generated while drilling. These seismic signals are then detected at the surface of the earth by a two-dimensional array of geophones. Measurements are made of the arrival times of the seismic signals at geophones located at the surface. From these measurements the travel times of the seismic waves from the source to the geophones are determined. Knowing the positions of the geophones with respect to the mouth of the borehole, it is possible to calculate the position of the bit in the earth in three dimensions at any time. An example of the prior art bit logging is the U.S. Pat. No. 4,003,017. In the bit logging art, the critical measurement is travel time of the seismic waves and the character or energy of the geophone signals is of no importance.

In the present invention, the opposite is true. The critical measurement is character or energy of the geophone signals, and the measurement of travel time is of no interest.

It is an object of this invention to provide an apparatus and method for making measurements in the earth during the process of drilling a borehole as a result of which pockets or reservoirs of gas-filled porous rock, at some distance above the drill bit, in the vicinity of the borehole, can be located.

It is a further object of this invention, by the use of a plurality of measurements made in the radial vicinity of the borehole, with a seismic source at different depths in the borehole, to make measurements which can identify the presence and position of gas-saturated rock reservoirs.

It is still a further object of this invention to make measurements at a selected series of depths while drilling in a borehole to determine the depth and the azimuthal and radial positions of a gas-filled porous reservoir rock.

It is another object of the invention to provide an apparatus and method for making measurements during on-shore or off-shore drilling.

These and other objects are realized and the limitations of the prior art are overcome in this invention by providing a seismic source as part of the drilling equipment, at or near the bit, and to provide either a single sensor or a plurality of seismic wave sensors, detectors, or geophones, positioned on or near the surface of the earth in selected positions connected through appropriate amplifiers which can be of a conventional type, to a seismic recording system. By measurements of the amplitude, energy, character, etc. of the received signals from each of a plurality of positions of the geophone(s), determination can be made as to whether there is a gas-filled porous rock formation located in the paths from the seismic source at the bottom of the drill pipe to one or more of the geophones at the surface. The presence of such a geologic formation would be indicated by a change in character and reduction in amplitude or energy of the received signals, and in other ways, when the path of the seismic wave passes through the gas-filled formation, and the geophones are in the resulting shadow pattern of the formation.

Different types of seismic sources can be used. One source which I have investigated at great length is the "tricone bit" which is a conventional rock bit, used for drilling deep boreholes in the earth. I have found that there is present in the noise generated in the vicinity of the cutting tips of the rock bit, a pronounced third harmonic signal. The frequency of this signal is three times the frequency of rotation of the drill pipe in the hole, corresponding to the three cones of the rock bit. Other harmonics of the drill rotation speed have also been observed, such as the sixth harmonic and others. All of the harmonics are potentially useful as signal components.

I have found that in the vicinity of the drill rig at the surface, around the mouth of the borehole, no third harmonic signal is detected. This indicates that this signal must come from the vicinity of the bit, not from the drill machinery at the surface and therefore it can be used as a signal which originates at the bit in determining whether or not a gas reservoir exists within limited radial range of the borehole, determined by the array of geophones at the surface. Of course, other types of seismic sources can be built into the drilling apparatus at the bit, or in the drill collars near the bit. Such a source can be, for example a set of jars or other similar equipment such as described in U.S. Pat. No. 4,003,017.

Of course, the simplest seismic source that might be used is one which is a part of the normal drilling equipment itself. However, there can be a number of others.

One such type of seismic source can be one that comprises means responsive to the flow of drilling mud through the drill stem while the borehole is being drilled. One example of that type of source is described in the U.S. Pat. No. 4,040,003.

Another type of seismic source can be a percussion sub in the drill string, in cutting operation on the bottom of the borehole, such as has been used in drilling hard rock formations.

Many types of sensing arrays can be used, such as arrays extending radially outward from a point near the mouth of the borehole. Alternatively, the sensing arrays can be in a circle, the center of which is at the mouth of the borehole. The sensing array might be spaced, in a selected manner, in one or more concentric circles. The sensing arrays can also be irregular in geometry. A single geophone can be moved from point to point to form the sensing array or a plurality of geophones or sensors may be used simultaneously to form the sensing array.

In the use of linear sensing arrays, such as the radial arrays, enhancement of the signal to noise ratio can be provided by using modern techniques of adaptive noise cancellation, particularly where a large part of the noise that is observed on the geophone signals arises from a volume of the earth which is at a direction which is substantially different from the direction from the array to the seismic source at the bottom of the drill pipe.

Furthermore, the linear sensing arrays can be designed as antennas, and the antenna design can be optimized automatically to be most sensitive in the direction toward the position of the source of the seismic waves at the bit.

These and other objects and advantages of this invention and a better understanding of the principles and details of the invention will be evident from the following description taken in conjunction with the appended drawings in which:

FIG. 1 is a prior art illustration of reflection and transmission of seismic waves.

FIG. 2 shows schematically one embodiment of this invention including sharply tuned band pass filtering.

FIG. 3 illustrates in plan view of one possible array of sensors or geophones.

FIG. 4 illustrates schematically what the group of electrical signals outputted from the group of band pass filters of FIG. 2 might look like for the condition shown in FIGS. 2 and 3.

FIG. 5 illustrates the interpretation of received signals to determine precise position of the gas-filled formation.

FIG. 6 shows schematically another embodiment of the invention employing spectral analysis.

FIG. 7 illustrates the use of power spectra in the interpretation of received data.

FIG. 8 illustrates the use of an adaptive filter for signal-to-noise ratio improvement.

FIG. 9 illustrates an adaptive antenna system for signal-to-noise ratio improvement.

FIG. 10 illustrates still another embodiment of the invention employing the principle of reciprocity.

The present invention will be better understood by reviewing briefly the principles of the transmission and reflection of seismic waves at geologic interfaces in the earth. Referring to FIG. 1, the earth 110 having a surface 112 is shown having three geologic formations, 121 at the surface, 122 below the formation 121 with an intervening contact or interface 118, and a third formation 123 in contact with 122 at an interface 119.

A seismic source 114 is set up at the surface and a plurality of sensors such as geophones 116A, 116B, etc. are spaced from the source 114. By conventional representation, a ray of seismic energy 120 passes downwardly to reflection point 124 at the interface 118 where generally part of the energy is transmitted across the interface 118 as ray 120B and part is reflected as upwardly reflected ray 120A.

Again, at interface 119 part of the energy of ray 120B is transmitted at reflection point 126 across the interface 119 as ray 120F and part is reflected upwardly as ray 120C.

Part of the upwardly traveling ray 120C at reflection point 128 is transmitted across the interface 118 from below as the ray 120E and part is reflected downwardly as ray 120D, and so on.

There are several conditions in this process that are well known. First, at the reflection points the angles of incidence and reflection are equal. This occurs at all reflection points such as 124, 126, 128 and so on. At point 124 the angles a and b are equal. Second, the division of energy as between the incident wave 120 and the reflected wave 120A is determined by the relations that follow.

The reflection coefficient R is $$R = \frac{A_r}{A_I} = \frac{\rho_2 V_2 - \rho_1 V_1}{\rho_2 V_2 + \rho_1 V_1}$$

The reflection coefficient is the ratio of the amplitude of the reflected wave to the amplitude of the incident wave.

$A_r$ is the amplitude of the reflected wave.
$A_I$ is the amplitude of the incident wave.
$\rho_1$ is the density of formation 1 from which the wave is incident onto the interface.
$\rho_2$ is the density of formation 2 into which the wave is transmitted.
$V_1$ is the velocity of seismic wave transmission in formation 1.
$V_2$ is the velocity of seismic wave transmission in formation 2.

The ratio of the reflected wave energy to the incident wave energy is given by the square of the reflection coefficient, $$\frac{E_R}{E_I} = R^2 = \left(\frac{\rho_2 V_2 - \rho_1 V_1}{\rho_2 V_2 + \rho_1 V_1}\right)^2$$

By conservation of energy, the energy of the transmitted wave in formation 2 is given by $$E_t = E_I - E_R.$$

The quantity $\rho V$ is called the acoustic impedance of a selected geologic formation. Such formations in the earth have independent densities and velocities. Thus two different formations may have the same acoustic impedance, yet be considerably different in $\rho$ and V. The reflection coefficients R are generally small at the interfaces so that sufficient energy can be present in deep reflections after having been traversing many hundreds of geologic interfaces.

However, where the reflection takes place between a solid and a liquid because of the disparity in density and velocity, the reflection coefficient can be quite large. Also where the interface is between rock and air or other gas such as at the surface of the earth, the reflection coefficient can be almost 100 percent and the energy transmitted through the interface is correspondingly very small.

Referring now to FIG. 2, there is shown in schematic form one embodiment of this invention. The surface of the earth 12 is shown by numeral 10, with a vertical borehole 14 drilled at a selected location in the earth. The mouth of the borehole is indicated by numeral 14A. There is a horizontal geological formation 16 at a selected depth d, which may be a rock having substantial porosity. Over a limited horizontal region 18, the pores of this rock are filled with gas rather than a liquid such as oil or water. The objective of the apparatus and method of the present invention is to locate that gas-filled porous rock 18 and to determine its depth d and its lateral positions a and b relative to the borehole.

The portion of the porous rock that is filled with gas can be of many shapes and sizes, the gas being locked in a selected portion of the formation by faults, mineralization, structure, etc. as is well known in petroleum geology. For convenience and for purpose of illustrations, this gas filled rock will be assumed to be circular and will be referred to as "gas filled porous rock", "gas saturated rock", "gas pool", "gas saturated formation", "gas zone", "gas pocket", and so on. As is well known, the gas pool may lie above an oil pool and accordingly in the apparatus and method to be described, is useful in identifying oil pools.

The drilling equipment, not shown in FIG. 2, would include a drilling rig 19 of conventional design, including a drill stem or drill string extending into the earth. There is a source of seismic waves 40, which will be described more fully below, in the borehole. This source 40 in FIG. 2 is labeled 40A when it is at a position A at depth $d_1$ and is labeled as 40B at position B at depth $d_2$.

The source 40 creates a spherical seismic wave that moves radially outwardly and, of course, upwardly toward the surface and to the sensors or geophones 20A, 20B, 20C . . . 20N placed at the surface of the earth 10. It is understood that a single sensor or a small cluster of interconnected sensors may be used and positioned to receive waves at the positions 20A . . . 20N.

The seismic wave energy travels along rays such as 36 and 37 from source 40A and along rays 38 and 39 from source 40B. The cone of energy between rays 38 and 39 from source 40B is directed upwardly through the gas reservoir, zone or pocket 18. This cone of energy is aimed toward geophones or positions 20C, 20D, 20E and 20F. Similarly, the rays 36 and 37 form a symmetrical cone of seismic energy originating at the source 40A at position A and extending through the zone 18 and aimed at sensors or positions 20D, 20E, 20F, 20G and 20H.

Because of the high reflection coefficient in the cases where seismic energy passes from rock with liquid filled pores to rock with gas filled pores, correspondingly less energy is transmitted up through the gas zone. Thus the gas zone 18 will cast a shadow and provide less energy on the geophones 20C, 20D, 20E and 20F from sources 40B and 20D, 20E, 20F, 20G and 20H from source 40A below the level of formation 16.

The closer the spacing of the geophones radially and circumferentially, the sharper the location of the position of 18.

Preferably all geophones would be recorded simultaneously and stored. Then, at later times the separate sensor signals can be processed to determine the boundaries of the shadows.

Referring now to FIG. 3, there is shown a plan view of the surface of the earth, based on FIG. 2, indicating the mouth of the borehole 14A and a linear array 32 of geophones such as 20A, 20B . . . 20F, 20G, etc. The circle 18' indicates the plan view of the gas pool or gas zone 18. Crosshatched circles 30B and 30A indicate the extent of the shadow at the surface of the seismic energy passing through the gas zone 18 from sources 40B and 40A respectively.

It will be seen that, in view of the different positions such as A and B, which can be taken by the source 40, the shadow regions 30B and 30A illustrated by the circles in FIG. 4 can be of different size and different radial position. Different groups of geophones 20 will give indications of the zone 18 at different depths of the seismic source.

It will be clear that to determine the position of a gas zone of relatively small dimensions such as 18, the spacing of the geophones 20 as in FIGS. 2 and 4 must be somewhat smaller than, and preferably a small fraction of, the dimension of the expected size of the smallest shadow of the gas reservoir 18. Also if it is not known in which direction, to right or left, for example, of the borehole is the expected position of the gas zone, it will be necessary to have a plurality of arrays, such as that shown along the line 32, but arranged on different radial lines such as 32A, 32B, 32D and so on. It will be clear also that for best results the angular spacing of the radial arrays 32 should be related to the expected diameter of the smallest shadow of the gas zone 18.

Refer again to FIG. 2. Knowing the positions A and B of the source 40 in the borehole at at least two different depths $d_1$ and $d_2$ and knowing the lateral positions of the geophones along the lines 32 on the surface and the specific directions of the bounding rays 36, 37 and 38, 39 of the two cones of shadow caused by the gas reservoir 18, it is possible to determine the position of zone 18, whose boundaries occur at the intersections of rays 36 and 38 and of rays 37 and 39. The shadow zones are determined from the signals received by the geophones 20 from the source A, and from the signals received by the geophones 20 from the position B of the source, and so on. Much more data and more accurate pinpointing can be achieved by obtaining measurements at a number of depths.

In FIGS. 2 and 3 one embodiment of this invention is shown in which the seismic source is a tricone rock bit which produces a high level of seismic noise of wide frequency band, but containing specific sharply tuned harmonic signals such as, for example, the 3rd harmonic frequency of the frequency of rotation of the drill stem.

Two systems of processing the data are shown. One system uses a series of band pass filters 26 tuned to the 3rd harmonic or other harmonic signal. Such signal might be, for example, 5 Hertz, corresponding to the 3rd harmonic of a drill stem rotation of 100 revolutions per minute.

Referring to FIG. 2, the sensors or geophones 20 are connected through a multiconductor cable 22 to a plurality of conventional amplifiers 24. The outputs of the amplifiers 24 are applied through leads 25 to a plurality of narrow bandpass filters 26 which pass signals at the frequency of the seismic source or a harmonic thereof. These signals are then sent to a recorder 28 for storage. The stored signals can be retrieved for processing as, for example, by comparison of the amplitudes.

FIG. 4 illustrates short time sections of the 3rd harmonic signals as 46A, 46B, 46C... 46I corresponding to each of the recorded band-pass signals from the sensors, in the linear array of FIG. 2. The signals 46 correspond to the source 40A. These show the low value of signal from geophones in the shadow of the gas zone, 20D, 20E, 20F, 20G and 20H. Correspondingly, signals 48A, 48B, 48C... 48I show 3rd harmonic signals from source 40B, at some later time in the drilling of the borehole 14 when the bit and source and at position 40B. The rays of seismic energy 38 and 39 are differently oriented, and different geophones such as 20C, 20D, 20E and 20F intercept the seismic energy in the shadow of the gas reservoir 18. This shows up on the corresponding record B, where the amplitudes of signal from geophones 20A, 20B, 20G, 20H and 20I are larger than the four signals from geophones 20C, 20D, 20E and 20F. The band pass filters are assumed to be tuned to the third harmonic of drill shaft in this illustration. Other harmonics could similarly be used by appropriately tuning the band pass filters.

The method of this invention depends on the fact that seismic energy traveling upwardly from a source below the gas reservoir 18, will be attenuated at geophones positioned above, in the shadow of the gas filled reservoir. The reason for this is that the presence of a porous rock filled with gas and having seismic energy arriving from below, from a rock of greater acoustic impedance, will reflect part of the energy downward and therefore less energy will be transmitted upwardly through the geological formation. When the pores are filled with gas, the downwardly reflected energy is greater than when the pores are filled with liquid, such as oil or water. Thus, the seismic rays in the space above the formation 18 will be of lower energy than the seismic rays which do not intercept the gas-filled portion 18 of the geological formation 16.

All of these phenomena are based upon seismic wave propagation theory and practice discussed in connection with FIG. 1, and follow from the well known bright spot technology, which has been widely described in the literature and needs no further description at this time. Current text books in seismic exploration can be referred to for full details of the process of reflection and transmission of seismic energy through geological formations, and particularly through gas-filled porous rock formations.

One important point of difference between this invention and the conventional bright spot process is, that the conventional bright spot operation is carried out with a surface seismic source and a surface array of geophones. With the conventional seismic process, seismic energy starting from a near surface source passes downwardly, and is reflected upwardly at the gas-filled porous rock reservoir, to one or more of the geophones. Because of the change of acoustic impedance, seismic waves traveling downwardly from a dense rock to the less dense gas-filled rock, will have a large reflection coefficient. Therefore, those rays which are reflected from the gas-filled zone 18 will be of larger amplitude than those rays reflected from the adjacent areas of the rock formation 16.

In the case of one embodiment of this invention, because of the transmission upwardly through the gas-filled porous rock from below, there will be less amplitude and energy in the shadow, and therefore the objective will be to look for seismic signals of lesser amplitude and energy in the shadow.

Referring to FIG. 5, when the shadow region 30 is determined from signal measurements at the surface 10, the geometric parameters of the gas pool 18 can be related to the shadow parameters. Along the cross-section shown in FIG. 5, the distances $a_1$ and $b_1$ are known, and depth d of the seismic source at the drill bit is known. The borehole is assumed to be vertical. If not, the geometrical considerations can be suitably modified. The bottom boundary of the gas pool must be a substantially horizontal layer.

From elementary geometry, $$\frac{a}{a_1} = \frac{d_1-d}{d_1} \text{ and } \frac{b}{b_1} = \frac{d_1-d}{d_1} \tag{1}$$

If similar shadow measurements were taken with the seismic source at a different depth, say $d_2$, it therefore follows that $$\frac{a}{a_2} = \frac{d_2-d}{d_2} \text{ and } \frac{b}{b_2} = \frac{d_2-d}{d_2} \tag{2}$$

The seismic source depths are known. Furthermore, the boundaries of the shadows $S_A$ and $S_B$ of source 40A and 40B and the distances $a_1$, $b_1$ and $a_2$, $b_2$, are assumed to be known. The three gas pool parameters a, b, and d are to be determined from the above four equations. Rearranging equations (1) and (2), $$\frac{a}{a_1} = \frac{d_1-d}{d_1} ; \frac{a}{a_2} = \frac{d_2-d}{d_2} \tag{3}$$

$$d_1 a + a_1 d = a_1 d_1$$

$$d_2 a + a_2 d = a_2 d_2$$

The linear equations (3) have the solution $$a = \frac{a_2 a_1 d_1 - a_1 a_2 d_2}{d_1 a_1 - d_2 a_1} ; d = \frac{d_1 d_2 a_2 - d_1 d_2 a_1}{d_1 a_2 - d_2 a_1} \tag{4}$$

Once again, from equations (1) and (2), $$\frac{b}{b_1} = \frac{d_1-d}{d_1} ; \frac{b}{b_2} = \frac{d_2-d}{d_2} \tag{5}$$

$$d_1 b + b_1 d = b_1 d_1$$

$$d_2 b + b_2 d = b_2 d_2$$

Equations (5) have the solution $$b = \frac{b_2 b_1 d_1 - b_1 b_2 d_2}{d_1 b_2 - d_2 b_1} ; d = \frac{d_1 d_2 b_2 - d_1 d_2 b_1}{d_1 b_2 - d_2 b_1} \tag{6}$$

The desired gas-pool parameters a, b, and d can be obtained from equations (4) and (6).

Since equations (1) and (2) are over constrained (four equations and three unknowns), it is not surprising that equations (4) and (6) provide two determinations of the parameter d. The two values of d should agree and such agreement would provide a check on the method. Accuracy would be improved by averaging the two values of d. Greater accuracy could also be had from shadow measurements taken with the source at other depths than $d_1$ and $d_2$ below that of the gas pool. A best least squares solution could be used to pinpoint the values of a, b, and d.

The preferred embodiment of the invention is shown in FIG. 6. In this embodiment, the individual geophones of an array are coupled through a multiconductor cable 22 to a plurality of amplifiers 24 which, in turn, have their outputs applied to a plurality of spectrum analyzers 43 which provide at their outputs displays of signal power as a function of frequency. The geophone signals could just as well be amplified and coupled by radio links to the spectrum analyzers. The spectral peaks indicate power received at the various harmonic seismic source frequencies. The areas under the peaks are indicative of the strengths of the harmonic signal powers received by the individual geophones and thereby also indicate the shadow by showing a lower amplitude signal from the geophones in the shadow zone as compared to the geophones not in the shadow zone. In this method, use of band pass filters is not necessary since the spectrum analyzer displays the signal power density as a function of frequency and provides outputs representative thereof. This method using spectrum analyzers has a practical advantage over the method using band pass filters since the latter must be tuned to an appropriate harmonic of the drill shaft turning frequency. Since the turning rate of the drill string varies considerably over time, the spectrum analyzer, which is tuned to all frequencies simultaneously within a preselected band of frequencies, will always receive the signal, whereas the band pass filter will only receive the signal when it is properly tuned to the signal frequency.

The individual outputs from the spectrum analyzers may be recorded by a set of recorders 45 whereby the spectral outputs can later be reproduced for analysis as, for example, by measuring the power under the peaks above the background or baseline, or by comparison of the signals with one another to thereby identify the shadow geophones or receivers.

Modern spectrum analyzers, such as those commercially available on the market and made by Hewlett-Packard, General Raio Co., and others, can perform the digital Fourier transform calculations which form the basis of the spectral analysis. Furthermore, they have the ability to store the power spectrum taken from a first block of N data samples so that it may be averaged with the power spectrum taken from a subsequent data block. Averaging, or stacking, over many data blocks, generally called ensemble averaging, is easily done with modern commercially available equipment. The effect is an enhancement of signal-to-noise power ratio, which is a function of the number of spectra averaged. Weak signals buried in noise can be readily detected in most cases.

Geophone outputs containing weak third harmonic signals buried in noise have been detected by this means. A typical result is illustrated in FIG. 7. Signal strength is indicated by the area of the third harmonic peak 92 above the background energy level 90. The peak 92 shown in FIG. 7 corresponds to a third harmonic frequency of 5 Hz which, in turn, corresponds to a drill stem rotational speed of 100 RPM. The special peak is spread somewhat because the shaft RPM at the bit fluctuates slightly about the mean RPM. This is caused by torque fluctuations on the bit as it bores into the earth, reacting upon the drill stem which acts like a very long torsional spring. In addition to the third harmonic signal, other harmonics are often present and they also can be useful in signal detection, as is the third harmonic signal. FIG. 7 is a typical averaged power spectrum of geophone output containing 3rd harmonic signal plus earth noise. By comparing the peaks taken at various locations, it is possible to identify the shadow from a gas pool. The power loss may also provide information regarding the size and gas content. In cases where the speed of the rotary table varies considerably over time, ensemble averaging can smear the spectral peaks of signal harmonics and thereby reduce their detectability. This difficulty can be remedied by triggering the internal time base or "clock" of the digital spectrum analyzer 43 with pulses derived from a tachometer 46 coupled to the rotary table of the drill rig. In this mode of operation, the sampling period of the spectrum analyzer input data expands and contracts with variations in shaft speed and the analyzer time base expands and contracts accordingly. The effect is that a signal spectral peak corresponding to a given shaft harmonic would move up and down in frequency position as shaft speed increased and decreased if the analyzer clock frequency were constant, but this signal peak would stay in the same spectral position even when the shaft speed varied if the analyzer clock rate were set to be a fixed multiple of the shaft rate as in FIG. 6. Ensemble averaging of spectra containing signal peaks on a noise background, where the peaks remain in the same spectral position, will cause the peaks to be enhanced against the background noise and will permit the detection of faint signals in noise in spite of variations in RPM of the rotary table.

Operating under the control of an external clock signal is easily done with modern digital spectrum analyzers. The line carrying the clock signal is line 47, seen in FIG. 6. This clock signal is obtained from shaft tachometer 46 whose frequency is multiplied by frequency multiplier 48.

In order to further improve signal detectability, adaptive noise cancelling techniques can be used to reduce or eliminate the effects of the drill machinery noise which propagates to the receiving geophone arrays by rays which travel close to the earth's surface. Adaptive noise cancelling is described by B. Widrow et al in the article entitled "Adaptive Noise Cancelling" appearing in the Proceedings of the IEEE, Vol. 63, No. 12, December 1975, incorporated herein by reference.

Referring now to FIG. 8, a special machinery noise sensing geophone 60 or other source of signal corresponding to machinery noise is placed on or close to the drill rig 58. Its output voltage travels by line 61 and is delayed in 62 by a selected time Δ sec, corresponding to the propagation delay time from the drill rig 58 to the site of the receiving geophone. After delay, this machinery noise is filtered by an adaptive filter 63 and subtracted 65 from the output of the receiving geophone. The receiving geophone 20F picks up signals from the downhole seismic source, in addition to machinery noise. The downhole source is uncorrelated and independent with respect to the machinery noise. The adaptive noise cancelling process eliminates the component of the receiving geophone output which is correlated with the adaptive filter input, containing machinery noise. In this way, the machinery noise component is canceled. It is clear that by using a plurality of adaptive noise cancelling systems, machinery noise can be eliminated from all of the geophone outputs simultaneously. Otherwise, the same adaptive noise cancelling system can be used successively with each of the sensors to observe the presence of and the energy content of the individual geophone signals.

This processing with the adaptive noise filter system improves signal to noise ratio and makes easier the observation of the signal from the downhole seismic source.

Sometimes the geophone 60 cannot be placed at the source of the interfering noise, as in FIG. 8, such as when, for example, the noise is generated at another drilling well 66, access to which is not available. The interfering noise may consist of drill bit emanations 67 from the other well, which could be similar to the emanations from the drill bit of the well of interest. This case is illustrated in FIG. 9. Here, the array of sensors or geophones 20 are tied together in a beam forming circuit 68. The beam has an axis of maximum sensitivity, determined by the main lobe 69, directed to the source of the noise. This it does by delaying and summing the input signals for beam steering. This is well known in the art, for example, in the article entitled "Adaptive Antenna Systems" by B. Widrow et al, Proceedings of the IEEE, Vol. 55, No. 12, December 1967, incorporated herein by reference.

The output signal of the beam is sent by line 70 to an adaptive filter 71. The filter output is subtracted 72 sequentially from the output 82 of each of the geophones 20 that received signals by rays 34 for example from the seismic source of interest.

The output of the noise cancelling circuit 72 then goes by lead 73 to the spectrum analyzer 74, or to a band pass filter for signal analysis.

It will be clear from FIG. 9 that the sensors 20 serve two different purposes. They not only serve to detect the signal from the source 40A that arrives via rays, such as 34, but they also independently supply noise signal to the beam former 68. It is clear that the beam output could be fed to a plurality of adaptive cancellers to eliminate interference from all of the geophone outputs simultaneously.

As is well known in seismic operations, sources and receivers can be interchanged without changing the paths by which seismic waves travel. This invention can, of course, be carried out using reciprocity theory. This is illustrated in FIG. 10 where seismic sources A and B, located at the surface, provide waves which travel to a geophone 86 placed in the borehole 87. With equal excitation applied either simultaneously or in a known sequence by the sources A and B, the seismic waves $r_A$ and $r_B$ are received by the geophone 86 which generates signals which may be processed and recorded in the manner previously described. A shadow path is indicated by a reduced signal amplitude at geophone 86 from source B. A clear path is indicated by a relatively stronger received signal amplitude at geophone 86 from source A, after accounting for energy spreading along ray paths of various lengths.

It is apparent that the present invention is applicable to off-shore drilling. Geophones or sensors can be placed on the ocean floor or hydrophones or floating sensors can be used at the surface to receive seismic emanations from the drill bit. The sensors or phones can be connected to recorders by cables or by radio links. Furthermore, this invention in its reciprocal form, as illustrated in FIG. 10, can be used with off-shore drilling in the following manner. Sources A and B and other sources can be impulsive in nature and generated either by explosives or by an air gun towed behind a seagoing vessel. Strong and weak impulse responses received by the downhole geophone 86 will indicate clear and respective shadow ray paths.

It will also be apparent that the spaced geophones or sensors may be located in adjacent boreholes to receive waves traveling different paths, exploring for gas pools which would create shadows along the ray paths between boreholes.

In summary, this invention makes use of seismic radiation passing through the gas-filled portion of the formation of interest, rather than being detected after reflection from the formation, as in "bright spot" operations.

What has been described is a system for making measurements at surface geophone arrays from a selected seismic source, at or near the bit in a drilling system, while drilling in a deep borehole. The measurements involve the signal character, amplitude, or energy arriving from the source, to each of the geophones in one or more arrays. If there is a gas-filled porous rock 18 present, at some depth d between the source 40 and the surface 10, then one or more of the geophones will be in the shadow of the horizontal area of this gas-filled reservoir. Thus, the signals received from those geophones will be modified, in accordance with the bright spot theory, and thus can be identified as being in the shadow of such a reservoir. Thus, the radial location, size, and depth of the reservoir can be determined by specific measurements made for at least two different depths of the seismic source.

However, the optimum method of carrying out this invention is to use a single source and a great many sensors or geophones, all of which are recorded simultaneously. In such a case, since the received signals all come from the same source at the same time, the comparisons of signals from the source are more meaningful and less sensitive to natural signal source intensity variations.

While the invention has been described with a certain degree of particularity, it is manifest that many changes may be made in the details of construction and the arrangement of components. It is understood that the invention is not to be limited to the specific language used, or the specific embodiments set forth herein by way of exemplifying the invention, but the invention is to be limited only by the scope of the attached claim or claims, including the full range of equivalency to which each element or step thereof is entitled.

I claim:

1. Apparatus for determining while drilling the position of a gas-saturated rock formation in the vicinity of a borehole in the earth, comprising:
   (a) a rotary drill bit for generating periodic seismic waves as it drills into the earth;
   (b) a plurality of transducer means located on the surface at preselected positions for defining a first plurality of seismic wave paths between a first position of said drill bit on one side of said gas-saturated porous rock formation and said plurality of positions on the surface and a second plurality of seismic wave paths between at least a second position of said drill bit on said same side of said gas-saturated porous rock formation and said plurality of positions on the surface, said transducers simultaneously generating signals responsive to said seismic waves at said first and second drill bit positions;

(c) means including frequency selection means connected to receive the signals generated by said transducers and generate signals representative of the amplitude and energy of the seismic wave transmitted through said first and second plurality of seismic wave paths at a selected harmonic of the rate of rotation of the drill bit;

(d) means for comparing the amplitude and energy of the simultaneously generated signals to identify signals corresponding to seismic waves traveling through said gas-saturated porous rock formation at said first and second locations; and (e) means for determining from the identified signals the position of the gas-saturated porous rock formation.

2. Apparatus as in claim 1 wherein said means including frequency selection means includes bandpass filters tuned to the selected harmonic of the rate of rotation of the drill bit.

3. Apparatus as in claim 1 wherein said means including frequency selection means includes a corresponding set of spectrum analyzers for receiving said signals, their time bases or time clocks being synchronized to the rate of rotation of the drill pipe supporting the drill bit, and whose output displays allow direct measurement of amplitude and energy at the selected harmonic frequency.

4. Apparatus as in claim 3 wherein said means for comparing the amplitude and energy of each of said signals generated at each of said positions includes an adaptive noise cancelling system for receiving said signals and signals representing noise and providing low noise signals to the spectrum analyzer.

5. Apparatus as in claim 3 in which said spectrum analyzers ensemble average the facsimile signals to enhance the signal to noise ratio.

* * * * *